United States Patent
Quintero et al.

(10) Patent No.: US 9,016,374 B2
(45) Date of Patent: Apr. 28, 2015

(54) HEAT REMOVAL IN DRILLING AND PRODUCTION OPERATIONS

(75) Inventors: Lirio Quintero, Houston, TX (US); Othon Rego Monteiro, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 432 days.

(21) Appl. No.: 13/439,662

(22) Filed: Apr. 4, 2012

(65) Prior Publication Data

US 2012/0216990 A1    Aug. 30, 2012

Related U.S. Application Data

(63) Continuation-in-part of application No. 12/780,591, filed on May 14, 2010, now Pat. No. 8,356,667.

(60) Provisional application No. 61/472,313, filed on Apr. 6, 2011, provisional application No. 61/186,651, filed on Jun. 12, 2009.

(51) Int. Cl.
  *E21B 36/00*    (2006.01)
  *C09K 8/035*    (2006.01)
  *C09K 8/60*    (2006.01)

(52) U.S. Cl.
  CPC ............ *C09K 8/035* (2013.01); *C09K 8/602* (2013.01); *C09K 8/604* (2013.01); *E21B 36/001* (2013.01)

(58) Field of Classification Search
  None
  See application file for complete search history.

(56) References Cited

U.S. PATENT DOCUMENTS

| | | |
|---|---|---|
| 3,954,627 A | 5/1976 | Dreher et al. |
| 4,434,062 A | 2/1984 | Oswald et al. |
| 4,911,232 A | 3/1990 | Colvin et al. |
| 5,007,478 A | 4/1991 | Sengupta |
| 5,435,376 A | 7/1995 | Hart et al. |
| 5,807,810 A | 9/1998 | Blezard et al. |
| 5,919,738 A | 7/1999 | Norfleet et al. |
| 5,964,692 A | 10/1999 | Blezard et al. |

(Continued)

FOREIGN PATENT DOCUMENTS

WO    2005090851 A1    9/2005

OTHER PUBLICATIONS

Friberg, E., et al., "A Non-aqueous Microemulsion", Colloid & Polymer Sci. 262, 252-253 (1984).

(Continued)

*Primary Examiner* — Zakiya W Bates
(74) *Attorney, Agent, or Firm* — Mossman Kumar & Tyler PC

(57) ABSTRACT

Working fluids, such as drilling fluids, may remove heat from other fluids, tools, equipments and environments and transfer it to other locations by using reversible phase change elements. The heat removal occurs through the absorption of heat by one or more phase transitions or a sequence of phase transitions in the elements of the working fluid. For instance, heat is absorbed when the phase change portions of the reversible phase change elements change phase including, but not necessarily limited to, a change from solid to smectic liquid crystal, from solid to nematic liquid crystal, from smectic liquid crystal to isotropic liquid, from nematic liquid crystal to isotropic liquid, from solid to isotropic liquid, and sequences and combinations thereof. Heat is released when the phase change reverses. These phase changes are first-order transitions and are associated with a latent heat or enthalpy.

19 Claims, 2 Drawing Sheets

(56) References Cited

U.S. PATENT DOCUMENTS

| | | | |
|---|---|---|---|
| 6,126,872 | A | 10/2000 | Kommareddi et al. |
| 6,130,190 | A | 10/2000 | Gunsel et al. |
| 6,166,095 | A | 12/2000 | Bryan et al. |
| 6,841,593 | B2 | 1/2005 | Kommareddi et al. |
| 7,144,844 | B2 | 12/2006 | Qu et al. |
| 7,151,077 | B2 | 12/2006 | Prud'homme et al. |
| 7,196,040 | B2 | 3/2007 | Heath et al. |
| 7,316,789 | B2 | 1/2008 | Lu |
| 7,633,980 | B1 | 12/2009 | Comaskey et al. |
| 7,859,845 | B2 | 12/2010 | Ullman et al. |
| 2002/0195739 | A1 | 12/2002 | Bagley et al. |
| 2005/0104029 | A1 | 5/2005 | Neuschuetz |
| 2008/0277162 | A1* | 11/2008 | DiFoggio ............... 175/17 |
| 2009/0032259 | A1 | 2/2009 | DiFoggio et al. |
| 2009/0183877 | A1 | 7/2009 | Quintero et al. |

OTHER PUBLICATIONS

Paz, L., et al., "Highly Curved Defect in Lyotropic (Non ionic) Lamellar Phases. Origin and Role in Hydration Process", J. Phys. Chem. 88 (16), 3415-3418 (1984).

Kunieda H. et al., "Self-Organizing Structures in Poly (oxyethylene) Oleyl Ether—Water System" J. Phys. Chem. 101, 7952-7957 (1997).

Alexandridis, P. et al, "A Record Nine Different Phases (Four Cubic, Two Hexagonal, and One Lamellar Lyotropic Liquid Crystalline and Two Micellar Solutions) in a Ternary Isothermal System of an Amphiphilic Block Copolymer and Selective Solvents (Water and Oil)," Langmuir, vol. 14, pp. 2627-2638 (1998).

Salager, J., "Microemulsions" Reprinted from Handbook of Detergents—Part A: Properties, G. Broze Ed., Surfactant Science Series, vol. 82, Chapter 8, pp. 253-302 (1999).

Drummond, C.J. et al., "Surfactant Self-Assembly Objects as Novel Drug Delivery Vehicles," Current Opinion in Colloid & Interface Science, vol. 4, pp. 449-456 (2000).

Spicer, P.T., et al., "Novel Process for Producing Cubic Liquid Crystalline Nanoparticles (Cubosomes)," Langmuir, vol. 17, pp. 5748-5756 (2001).

Forgiarini A. et al., "Formation of Nano-emulsions by Low-Energy Emulsification Methods at Constant Temperature" Langmuir, vol. 17, pp. 2076-2083 (2001).

Berni, M.G, et al., "A review of the rheology of the lamellar phase in surfactant systems;" Advances in Colloid and Interface Science, 98, 217-243 (2002).

Davis, V.A. et al., "Phase Behavior and Rheology of SWNTs in Superacids," Macro'molecules, vol. 37, pp. 154-160 (2004).

Dierking, I, et al., "Liquid crystal-carbon nanotube dispersions", Jnl of Applied Physics 97 044309 (2005).

Saez, I.M., et al., "Supramolecular liquid crystals" J. Mater. Chem., vol. 15, pp. 26-40 (2005).

Wu, Y et al., "A Study of Branched Alcohol Propoxylate Sulfate Surfactants for Improved Oil Recovery," SPE Annual Technical Conference and Exhibition, Dallas, TX, SPE 95404, pp. 1-10 (Oct. 9-12, 2005).

Kato, T. et al, "Functional Liquid-Crystalline Assemblies: Self-Organized Soft Materials," Angew. Chem. Int. Ed., vol. 45, pp. 38-68 (2006).

Acree, William E., et al., "Phase change enthalpyies and entropies of liquid crystals", J. Phys. Chem. Ref Data, vol. 35, No. 3 (2006).

Friberg, "S.E., Weight fractions in three phase emulsions with an LIN phase,"Colloids and Surfaces A: Physicochem. and Engineering Aspects, 282283, 369-376 (2006).

Zakri, C. et al., "Phase Behavior of Nanotube Suspensions: From Attraction Induced Percolation to Liquid Crystalline Phases," Jnl of Materials Chemistry, vol. 16, pp. 4095-4098 (2006).

Wu, Y. et al., "A Study of Wetting Behavior and Surfactant EOR in Carbonates With Model Compounds," SPEDOE Symposium on Improved Oil Recovery, Tulsa, OK, SPE 99612, pp. 1-11 (Apr. 22-26, 2006).

Palffy-Muhoray, P. "Orientationally Ordered Soft Matter: The Diverse World of Liquid Crystals," Liquid Crystal Communications, available at http://www.e-lc.org/docs/2007_08_26_01_36_22 (Aug. 26, 2007).

Fraunhofer-Gesellschaft, "Almost Frictionless Gears With Liquid Crystal Lubricants," Science Daily, 2 pp. (Nov. 11, 2008).

Nematel GmbH & Co. KG, http://www.nematel.com/index.html, last update (Sep. 12, 2008).

Goodby, J.W. et al., "Transmission and Amplification of Information and Properties in Nanostructured Liquid Crystals," Angew. Chem. Int. Ed. , vol. 47, pp. 2754-2787 (2008).

Fang, Yutang et al, "Study on polyethylene glycol/epoxy resin composite as a form-stable phase change material," Energy Conversion and Management 51, pp. 2757-2761 (2010).

Wang, Lijiu et al., "Fatty acid eutectic/polymethyl methacrylate composite as form-stable phase change material for thermal energy storage", Applied Energy 87, pp. 2660-2665 (2010).

Wu, Shuying et al., "Preparation and Melting/Freezing Characteristics of Cu/Paraffin Nanofluid as Phase-Change Material (PCM)", Energy Fuels 24 (2010).

* cited by examiner

HEAT REMOVAL IN DRILLING AND PRODUCTION OPERATIONS

CROSS-REFERENCES TO RELATED APPLICATIONS

This application claims the benefit of Provisional Patent Application No. 61/472,313 filed Apr. 6, 2011, and this application is further a continuation-in-part application of U.S. Ser. No. 12/780,591 filed May 14, 2010, which in turn claims the benefit of Provisional Patent Application No. 61/186,651 filed Jun. 12, 2009, all of which are incorporated by reference herein in their entirety by reference.

TECHNICAL FIELD

The present invention relates to methods and compositions for conducting operations in and near wellbores and/or subterranean formations, reservoirs, and hydrocarbon production facilities and more particularly relates, in one non-limiting embodiment, to conducting operations in and near wellbores and/or subterranean formations, reservoirs, geothermal wells and hydrocarbon production facilities using fluids containing liquid crystals, mesophases or other phase change materials to transfer heat from one location to another or to reduce the fluid temperature.

BACKGROUND

Drilling fluids used in the drilling of subterranean oil and gas wells along with other drilling fluid applications and drilling procedures are known. In rotary drilling there are a variety of functions and characteristics that are expected of drilling fluids, also known as drilling muds, or simply "muds". The functions of a drilling fluid include, but are not necessarily limited to, cooling and lubricating the bit, lubricating the drill pipe, carrying the cuttings and other materials from the hole to the surface, and exerting a hydrostatic pressure against the borehole wall to prevent the flow of fluids from the surrounding formation into the borehole.

Drilling fluids are typically classified according to their base fluid. In water-based muds, solid particles are suspended in water or brine. Oil can be emulsified in the water which is the continuous phase. Brine-based drilling fluids, of course, are a water-based mud (WBM) in which the aqueous component is brine. Oil-based muds (OBM) are the opposite or inverse. Solid particles may be suspended in oil, and water or brine is emulsified in the oil and therefore the oil is the continuous phase. Oil-based muds can be either all-oil based or water-in-oil macro-emulsions, which are also called invert emulsions. In oil-based mud, the oil may consist of any oil that may include, but is not limited to, diesel, mineral oil, esters, or alpha-olefins. OBMs as defined herein also include synthetic-based fluids or muds (SBMs) which are synthetically produced rather than refined from naturally-occurring materials. SBMs often include, but are not necessarily limited to, olefin oligomers of ethylene, esters made from vegetable fatty acids and alcohols, ethers and polyethers made from alcohols and polyalcohols, paraffinic, or aromatic, hydrocarbons alkyl benzenes, terpenes and other natural products and mixtures of these types. OBMs and SBMs are also sometimes collectively referred to as "non-aqueous fluids" (NAFs).

Damage to a reservoir is particularly harmful if it occurs while drilling through the pay zone or the zone believed to hold recoverable oil or gas. In order to avoid such damage, a different fluid—known as a "drill-in" fluid—may be pumped through the drill pipe while drilling through the pay zone.

Another type of fluid used in oil and gas wells is a completion fluid. A completion fluid is pumped down a well after drilling operations are completed and during the completion phase. Drilling mud typically is removed or displaced from the well using a completion fluid, which may be a clear brine. Then, the equipment required to produce fluids to the surface is installed in the well. A completion fluid must have sufficient density to maintain a differential pressure with the wellbore, which controls the well and to maintain the filter cake. The completion fluid must have sufficient viscosity and elasticity to maintain a suspension of bridging or weighting agents. The viscosity of a completion brine typically is maintained using polymers, such as starches, derivatized starches, gums, derivatized gums, and cellulosics. Unfortunately, although these polymers are water-soluble, they have a relatively low hydration rate in brines because very little water actually is available to hydrate the polymers in highly saline brines. Viscoelastic surfactants may also be used to viscosify drilling fluids, drill-in fluids, completion fluids, and the like.

It would be advantageous to improve the ability of drilling fluids, drill-in fluids, completion fluids and the like, to transfer heat from one portion of the well-bore, typically from the lower most or bottom portion, to cooler portions, namely the portions nearer the surface or to structures and environments on the surface. It would also be advantageous to improve the net specific capacity of drilling fluids, drill-in fluids, completion fluids and the like to absorb heat. As the quest for more and more oil and gas pushes explorers and operators to drill deeper, increasingly higher temperatures as wells become deeper increasingly become more of a factor in the functioning, durability and useful lifetime of equipment, tools, fluids and other structures used at these temperatures which may range as high as about 400° C. (about 752° F.). Indeed, conventional equipment at these temperatures may seize up or even melt and the only alternative may be to use expensive, exotic alloys. Similar problems may occur when equipment, such as pumps, are submerged. It would further be helpful to improve the methods and compositions for removing and redistributing the heat from these relatively hot portions of the wellbore and redistributing it to cooler portions of the wellbore or to structures and environments on the surface.

SUMMARY

There is provided, in one non-limiting form, a method of removing heat from a relatively hot portion of a conduit, in a non-limiting embodiment a wellbore, which involves transporting a fluid into the conduit where the fluid comprises a base fluid and a plurality of reversible phase change elements. The method additionally involves contacting the relatively hot portion of the conduit with the fluid and absorbing heat causes at least part of the reversible phase change elements to change phase, as well as transporting the fluid to a relatively cool environment and reversing the phase change of the reversible phase change elements releasing heat into the relatively cool environment. The conduit may be a wellbore or a pipe, umbilical, tubing or the like. Alternatively, the conduit may be a pipeline.

There is additionally provided in one non-limiting embodiment a working fluid that includes a base fluid that may be an aqueous fluid, a non-aqueous fluid, and combinations thereof. The working fluid also includes a plurality of form stable reversible phase change elements. Each reversible phase change element includes one or a combination of an aqueous phase, a non-aqueous phase, and a liquid crystal-forming component. The liquid crystal-forming components may include one or more of at least one surfactant, at least one polymer, at least one copolymer, nanotubes, and mixtures thereof.

Figure 1:
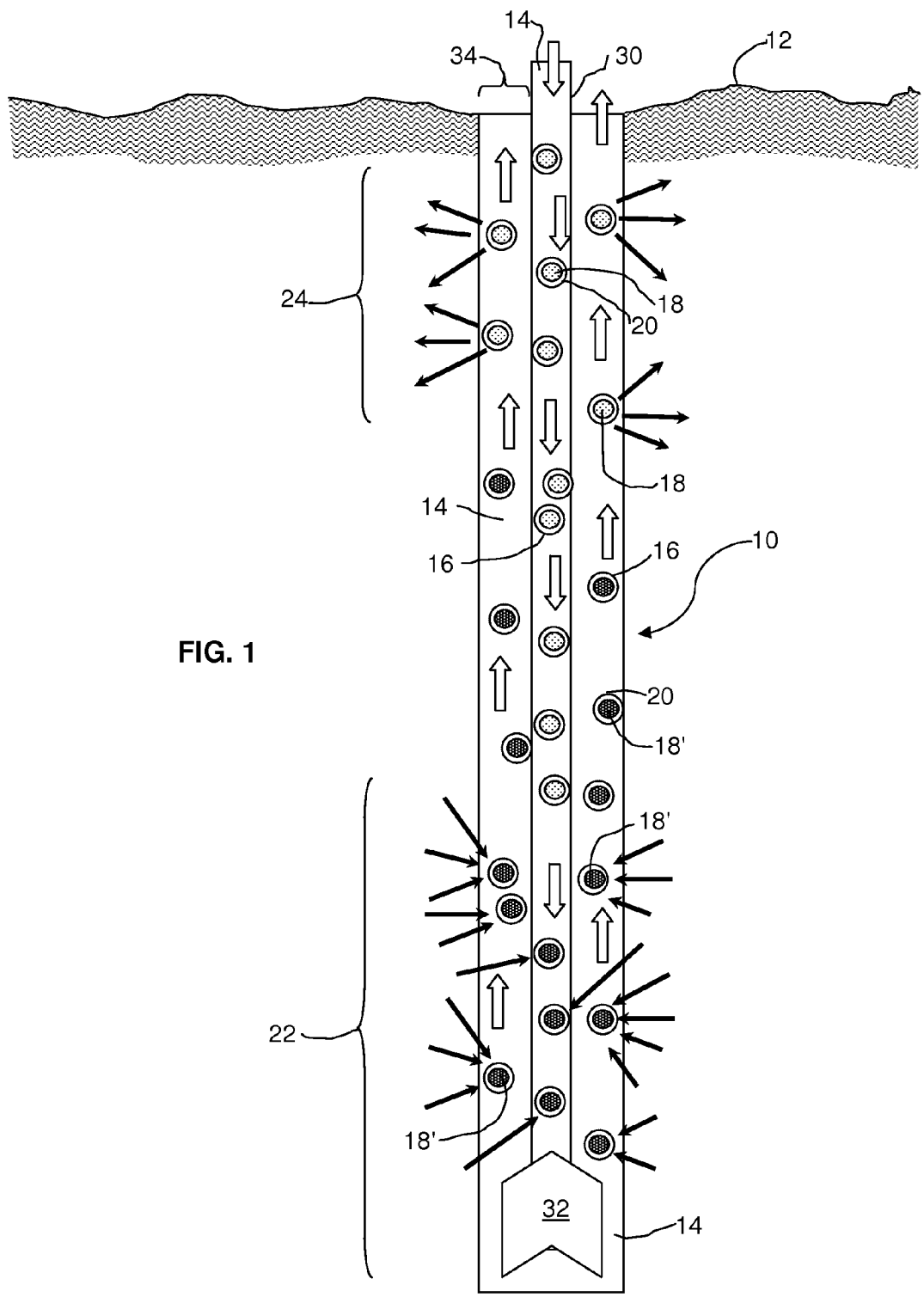
FIG. 1 is a schematic illustration of a wellbore having a fluid circulating therein where it is schematically shown that reversible phase change elements absorb heat in a relatively hot zone or portion of the wellbore and undergo a phase change and the reversible phase change elements release heat in the reversed phase change in a relatively cooler zone or portion of the wellbore.

It will be appreciated that FIG. 1 is only schematic and not to scale, and that many features of FIG. 1 are exaggerated for clarity and illustration only.

DETAILED DESCRIPTION

It has been discovered that the overall enthalpy change produced by one or more first-order phase transitions of additive materials (e.g. organic and/or inorganic and/or combined molecules containing an inorganic part and an organic part, etc.) in fluids may decrease the temperature of the fluid as it circulates through the hottest regions either in the wellbore, submerged equipment and/or surface operation equipment. The phase change is reversible and prevents or inhibits the circulating fluid to reach as high a temperature as it would in the absence of the phase change material (PCM). Raising the capacity of a circulating fluid to absorb heat provides the opportunity to lower its temperature within the wellbore. Heat can be absorbed by a substance either as sensible heat, i.e. accompanied by an increase in temperature, or as latent heat, i.e. accompanied by one or more phase changes that occur individually, severally or in a sequential manner (e.g. solid-to-liquid crystals followed by an additional phase change of liquid crystals-to-liquid).

More specifically, the method involves a circulating fluid that moves between a relatively hot zone or portion and a relatively cool zone or portion, moving heat from the relatively hot zone or portion to the relatively cool zone or portion, thereby providing cooling to the fluid itself, the relatively hot zone or anything in contact with the relatively hot zone that is heated therein, such as tools, equipment, or other structures. There may be more than one phase transition, such as in the case of liquid crystals, in which the sequence may be: a solid phase changing to a liquid crystal sequentially changing to an isotropic liquid (two sequential phase transitions). A single phase transition may be the phase change of a solid to an isotropic liquid. In any case, the fluid will be circulating between a cold zone or environment (e.g. the surface) and a hot zone (e.g. bottom of a wellbore or downhole). The phase transition temperature must be between the temperature of the relatively hot zone or portion and that of the relatively cool or cold zone or environment. As the fluid flows from the cold zone to the hot zone it transforms into the high temperature phase (e.g. liquid), and this transformation consumes or absorbs heat. Thus, the final temperature of the liquid at the hot zone will be lower than it would have been if there was no phase transformation. As the liquid circulates back to the cold zone, it will experience a reversible phase change (giving out heat).

In even more detail, the reversible phase change may include, but not necessarily be limited to, a reversible phase change from solid to smectic liquid crystal, from solid to nematic liquid crystal, from smectic liquid crystal to isotropic liquid, from nematic liquid crystal to isotropic liquid, from solid to isotropic liquid, and combinations thereof. In principle, all forms of liquid crystal phase change will work. It is, of course, not necessary that the phase change involve liquid crystals, that is, the PCM may have an absence of liquid crystals. Any endothermic phase change is theoretically suitable (i.e. absorbing heat as the material changes from a low temperature to a high temperature). Heat is released when the phase change reverses. These phase changes are first-order transitions with a latent heat or enthalpy, which may be used to decrease the temperature of the fluid.

Depending on the phase change material used, the phase transition may take place at a certain temperature, or over a temperature interval. In addition there are spatial variations of the temperature in the circulating fluid, in particular a working fluid circulating in a wellbore that penetrates a subterranean formation. It is reasonable to say that the phase change will happen over a certain length of the pipe or drilling string. At any time, there will be a section of the fluid that will have only the low temperature-phase (e.g. reversible phase change elements, which may contain portions thereof that are solids), and there will be a section that will contain only the high-temperature phase (e.g. the reversible phase change elements may contain some portion of liquid crystals or liquid). The former section will be around the relatively cold zone or environment, where the fluid temperature is below the phase-transition temperature, and the latter section will be around the relatively hot zone or portion, where the temperature is above the phase-transition temperature. Somewhere in between, there will be a section of the circulating fluid that contains both the high-temperature and the low-temperature phase. In this section, the fluid temperature is around the phase-transition temperature. The triggering event of the phase change is always the temperature, and additives that comprise all or an effective part of the reversible phase change elements may be selected that will have different phase-transition temperatures to accommodate the specific requirements of the process. That is, the working fluid and the method of using it may be tailored for a particular wellbore and the temperatures at various locations therein.

In one non-limiting embodiment suitable circulating fluids include, but are not necessarily limited to, drilling fluids, drill-in fluids, production fluids, servicing fluids, workover fluids, and remediation fluids. All of these fluids are sometimes collectively referred to herein as "fluids" or "working fluids". These working fluids may have a base fluid that is an aqueous fluid, a non-aqueous fluid and combinations thereof. As defined herein, the combinations include, but are not necessarily limited to, emulsions such as oil-in-water emulsions, water-in-oil emulsions, bicontinuous emulsions, microemulsions, nanoemulsions, and the like, and any other combinations described elsewhere herein. It will be appreciated that the methods and compositions may be applicable to any sufficiently large system having a fluid conduit that extends between a relatively hot zone or portion and a relatively cold zone or environment. Another example of equipment that benefits from the methods and compositions herein is an Electrical Submersible Pump (ESP), a pump powered by an electric motor suspended down hole on a tubing string. ESPs are a good choice for space limited applications such as offshore facilities, as well as to provide a relatively efficient form of artificial lift. High temperature formations will shorten motor life.

In other words, it has been discovered that fluids containing liquid crystals (LCs) can increase the ability of those fluids to transfer heat from a relatively hot zone or portion to a relative cold zone or environment in a wellbore placed at least partially within a subterranean formation having undesirably or difficultly hot portions thereof.

These liquid crystal compositions may contain, but are not limited to, organized hexagonal, cubic, or lamellar micelles. Lamellar and hexagonal micelles are birefringent. Birefringence refers to the decomposing of a ray of light into two distinct, different rays. Suitable liquid crystals may comprise, but are not necessarily limited to, nematic liquid crystals, smectic liquid crystals, lyotropic liquid crystals, thermotropic liquid crystals, chromonic liquid crystals, polymeric liquid crystals, cholesteric liquid crystals, ferroelectric liquid crystals, frustrated liquid crystals, columnar liquid crystals, nematic discotic liquid crystals, calamitic nematic liquid crystals, discoid liquid crystals, or ionic liquid crystals. It will be appreciated that all of the various phases of liquid crystals (called mesophases) may be included in the methods and compositions described herein.

Liquid crystals are well-known substances that exhibit a state of matter that has properties between those of a conventional liquid and those of a solid crystal. For instance, a liquid crystal (LC) may flow like a liquid, but its molecules may be oriented in a crystal-like way. There are many different types of LC phases, which can be distinguished based on their different optical properties (such as birefringence). When viewed under a microscope using a polarized light source, different liquid crystal phases will appear to have a distinct pattern or texture. The contrasting areas in the texture each correspond to a domain where the LC molecules are oriented in a different direction. Within a domain, however, the molecules are well ordered. LC materials may not always be in a LC phase. The name notwithstanding, liquid crystals are not crystals and they are not necessarily liquids. They are systems whose components possess long range orientational, but not positional order. One possibly more correct name is orientionally ordered soft matter. The liquid crystals may be self-organized, or may be organized by an outside influence, such as an applied electric field or temperature. In one non-limiting explanation, the LCs of the fluids described herein are self-organized and/or organized under the relatively high temperature conditions that exist within the relatively hot portions of a wellbore and/or subterranean formation.

The organized alignment of molecules in a liquid crystal may be designed to result in a suitable alignment that will result good absorption of heat while conducting operations in wellbores and/or subterranean formations and reservoirs, or in submerged conduits, such as pipe and umbilicals. The formation of ordered fluid films is the basis for the use of liquid crystals in heat transfer.

The liquid crystal nanostructure can be designed to be stimuli responsive that may be reversed to allow changes to the nanostructure in response to external changes such as, but not limited to, temperature so that the system can be used to transfer heat from one part of the system to another.

The thermochemical properties of more than 3000 organic compounds known to form liquid crystals are described by W. E. ACREE Jr., et al. in "Phase Change Enthalpies and Entropies of Liquid Crystals," *Journal of Physical Chemistry Reference Data,* Vol. 35, No. 3, 2006, pp. 1051-1330. While not all of the materials reported on will be suitable for the compositions and methods described herein, this article is a valuable resource for finding suitable liquid crystals for the compositions and methods described herein.

It should be understood that there may be many other suitable phase change materials besides liquid crystals. In one non-limiting example, the form stable phase change material may be a polyethylene glycol/epoxy resin composite as described by Y. FANG, et al. in "Study on Polyethylene Glycol/Epoxy Resin Composite as a Form-Stable Phase Change Material," *Energy Conversion and Management,* Vol. 51, 2010, pp. 2757-2761. Please also see L. WANG, et al., "Fatty Acid Eutectic/Polymethyl Methacrylate Composite as Form-Stable Phase Change Material for Thermal Energy Storage," *Applied Energy,* Vol. 87, 2010, pp. 2660-2665 which discloses that fatty acid eutectic/polymethyl methacrylate composites are suitable form stable PCMs, and S. WU, et al., "Preparation and Melting/Freezing Characteristics of Cu/Paraffin Nanofluid as Phase Change Material (PCM)," *Energy Fuels,* Vol. 24, 2010, pp. 1894-1898 which discloses copper/paraffin nanomaterials as suitable PCMs.

Other suitable phase change materials include, but are not necessarily limited to water, hydrocarbon compounds (e.g. tetradecane, hexadecane, octadecane, eicosane (icosane), methyl palmitate, pentaerythritol, neopentylglycol and the like), sodium, lithium, tin, bismuth, zinc, barium, eutectic alloys containing bismuth, cadium, indium, lead and tin, and the like, as described in U.S. Pat. No. 4,911,232 incorporated herein in its entirety by reference. Indeed, water containing one or more dissolved salts and/or an antifreeze (e.g. ethylene glycol, propylene glycol and the like) may be a suitable PCM. Different, non-limiting, potentially suitable phase change materials include hydrocarbons such as, neicosane, myristic acid, stearic acid, acetamide, and the like as described in U.S. Pat. No. 5,007,478 incorporated herein in its entirety by reference. Other, non-restrictive examples of potentially suitable phase change materials include, but are not necessarily limited to, paraffinic hydrocarbons (sometimes called paraffin waxes) having 13 to 28 carbon atoms, 2,2-dimethyl-1,3-propanediol, 2-hydroxymethyl-2-methyl-1,3-propanediol, acids of straight or branched chain hydrocarbons such as eicosanic acid and esters such as methyl palmitate, and fatty alcohols, along with halogenated paraffins having 10 to 22 carbon atoms and, more specifically, mono or poly-chlorinated and brominated paraffins such as bromooctadecane, bromopentadecane, bromononodecane, bromoeicosane, bromodocosane, etc. Suitable potential PCMs also include paraffins (e.g. heneicosane, docosane, tricosane, tetracosane, hexacosane, nonacosane, and the like), salt hydrates (e.g. sodium thiosulfate pentahydrate, sodium acetate trihydrate, sodium hydroxide monohydrate, mixtures of lithium nitrate and magnesium nitrate hexahydrate, trisodium phosphate dodecahydrate, magnesium nitrate hexahydrate and the like), carboxylic acids (e.g. myristic acid, stearic acid, and the like), sugar alcohols (e.g. xylitol, and the like) and polymers such as polyethylene, and the like. Additional potentially useful PCMs include, but are not necessarily limited to non-aqueous brines, eutectic materials, hydrogen peroxide and the like.

Somewhat surprisingly, it has been found that nanotubes, specifically carbon nanotubes, exhibit liquid crystal behavior under certain conditions. This behavior may occur when the nanotubes are stabilized in water by using a surfactant, in one non-limiting instance, sodium dodecyl sulfate (SDS). Other surfactants may be used which will be described below. These stabilized nanotubes are described in C. ZAKRI, et al., "Phase Behavior of Nanotube Suspensions: From Attraction Induced Percolation to Liquid Crystalline Phases," *Journal of Materials Chemistry,* 2006, Vol. 16, pp. 4095-4098. Another approach involves dispersing nanotubes in superacids, e.g.

sulfuric acid with various levels of excess $SO_3$, chlorosulfonic acid and triflic acid. Concentrations up to 10 wt % without the need for surfactants is described by V. A. DAVIS, et al., in "Phase Behavior and Rheology of SWNTs in Superacids," *Macromolecules*, 2004, Vol. 37, pp. 154-160.

Liquid crystal elastomers are useful for harsh environments such as high pressure and high temperature (HPHT) encountered in drilling completion and production operations. The high mechanical stress and strain, as well as their elasticity, make these materials desirable for equipment used in drilling completion and production. These elastomers combine the orientational ordering and phase transitions properties of liquid crystal systems and the rubbery elasticity of a polymer network. These phase transitions are also expected to be helpful in heat transfer.

It is expected that the liquid crystals may be pre-formed, that is, formed on the surface within the fluid or then added to the fluid which is then pumped downhole. The liquid crystals may be formed by self-organization of surfactants, polymeric surfactants, amphiphilic polymers, polymers, copolymers, graphite nano tubes, carbon nano tubes, lipids, proteins and Janus molecules and particles or their mixtures thereof or by self-assembly of highly specific functional supramolecules including but not limited to "Janus like" liquid crystals. By "Janus like" is meant structures designed on a molecular level including molecules and/or particles having two different types of mesogenic units (e.g. hydrophilic/lipophilic) grafted onto the same scaffold to provide specific properties that may be reversed in response to certain external stimuli, By "highly specific functional" supramolecules it is meant self-assembling systems made up of multiple components that are not covalently bound together but associated by specific molecular interactions, such as hydrogen bonds, ionic bonds and charge-transfer interactions and have built into their structure the ability to perform selective processing. Functional supramolecules are designed incorporating certain functionality within a liquid crystalline molecule through covalent attachment to the mesogen unit of a given functional unit, which in general is not well adapted to being organized in nanoscale architectures.

Surfactants suitable for creating liquid crystals herein include, but are not necessarily limited to non-ionic, anionic, amphoteric and cationic surfactants as well as blends thereof. Co-solvents or co-surfactants such as alcohols are optional additives used in the liquid crystals formulation. Suitable nonionic surfactants include, but are not necessarily limited to, alkyl polyglycosides, sorbitan esters, polyglycol esters, methyl glucoside esters, alcohol ethoxylates, fluorocarbon surfactants and the like. Suitable amphiphilic copolymers are formed by combination of complex polymers, such as polyvinylpyridines, polyacrylic acids, polyethylene oxides (PEO), polyisoprenes, polycarbosilanes, polypropylene imines, polyamidoamines, polyesters, polysilicones, and polyphenylenevinylenes (PPV). Suitable anionic surfactants include, but are not necessarily limited to, alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear and branched ether sulfates and mixtures thereof. Suitable cationic surfactants include, but are not necessarily limited to, arginine methyl esters, ester quats, alkanolamines and alkylenediamides. Suitable amphoteric surfactants include, but are not necessarily limited to, alkyl betaine, alkylamidopropyl betaine, sulfobetaines, aminopropionates, sultaines, imido propionic acids. Others suitable surfactants are dimeric or gemini surfactants, extended surfactants, silicone surfactants, Janus surfactants, cleavable surfactants and mixtures thereof. In one non-limiting embodiment at least two surfactants in a blend may be used to create the liquid crystals. "Cleavable surfactants" are a special class of surfactants with controlled half-lives that are rendered inactive by cleavage of some of their tailor-made weak chemical bonds, which break down either under acidic hydrolysis, alkaline hydrolysis or under the presence of ultraviolet light, in order to make the material compatible with a subsequent procedure, or in order to selectively remove the cleavage products, or in order to have the cleavage product impart a new function.

Extended surfactants, also called extended chain surfactants, may be defined as those containing a non-ionic spacer-arm central extension and an ionic or nonionic polar group. The non-ionic spacer-arm central extension may be the result of polypropoxylation, polyethoxylation, or a combination of the two, in non-limiting embodiments. In one non-limiting embodiment, the spacer arm may contain from 2 to 20 propoxy moieties and/or from 0 to 20 ethoxy moieties. Alternatively, the spacer arm may contain from 2 independently up to 16 propoxy moieties and/or from 2 independently up to 8 ethoxy moieties, where "independently" with respect to ranges herein means any combination of a lower threshold with an upper threshold. In a particular non-restrictive version, the spacer arm contains both propoxy and ethoxy moieties. The polypropoxy portion of the spacer arm may be considered lipophilic, however, the extended chain surfactant may also contain a hydrophilic portion to attach the hydrophilic group, which may generally be a polyethoxy portion, in one non-limiting embodiment having two or more ethoxy groups. These portions are generally in blocks, rather than being mixed, e.g. randomly mixed. It may be understood that the extended chain surfactant is an intramolecular mixture so that the extended chain surfactant achieves some gradual change from hydrophilic to lipophilic across the water/oil interface. Such surfactants help increase and thicken the interfacial region between the water and oil phases, which is desirable since this lowers interfacial tension and increases solubilization.

The lipophilic moiety of the extended surfactant may include C8 to C30 linear or branched hydrocarbon chains, which may be saturated or unsaturated. Carbon numbers as high as 30 for the lipophilic moiety may result if the moiety is highly branched, e.g. squalane, but in most cases may be no higher than C18. Suitable hydrophilic polar heads of the extended surfactant include, but are not necessarily limited to, groups such as polyoxyethylene (as described above), sulfate, ethoxysulfate, carboxylate, ethoxy-carboxylate, C6 sugar, xylitol, di-xylitol, ethoxy-xylitol, carboxylate and xytol, carboxylate and glucose. More details about extended chain surfactants may be found in U.S. Patent Application Publication No. 2009/0183877 A1, incorporated in its entirety by reference herein.

In many cases, the surfactant may be a surfactant blend with one of the above-noted surfactants and an optional co-surfactant, in which the co-surfactant is a short amphiphilic substance such as an alcohol having from 3 to 10 carbon atoms, alternatively from 4 to 6 carbon atoms (in non-limiting examples, n-propanol, n-butanol, iso-butanol, n-pentanol, hexanol, heptanol, octanol in their different isomerization structures) as well as glycols, and ethoxylated and propoxylated alcohols or phenols. In one non-restrictive embodiment the number of ethoxy units and/or propoxy units ranges from about 3 to about 15, alternatively from about 6, independently up to about 10. Alcohols are also noted herein as substances of intermediate polarity; that is, intermediate between non-polar substances such as oils and polar substances such as water.

In one non-limiting embodiment herein, the liquid crystals contain an optional non-polar liquid, which may include a synthetic fluid including, but not necessarily limited to, ester fluids; paraffins (such as PARA-TEQ™ fluids from Baker Hughes Drilling Fluids) and isomerized olefins (such as ISO-TEQ™ fluid from Baker Hughes Drilling Fluids). However, diesel and mineral oils such as ESCAID 110 (from Exxon) or EDC 99-DW oils (from TOTAL) and paraffin oils may also be used as a non-polar liquid in preparing the fluid systems herein.

Non-limiting broad and narrow proportion ranges for the various components of the fluids compositions are given in Table I. Any lower threshold may be combined with any upper threshold for the same component to give suitable proportion ranges. Alternatively, in another non-limiting version, the water and/or the oil are optional and may be excluded.

TABLE I

PROPORTIONS OF PHASE CHANGE COMPONENTS, WT %

| Component | Broad Range | Narrow Range |
| --- | --- | --- |
| Water | 0-98 | 170 |
| Liquid crystal forming or other phase change material (e.g. surfactant) | 1-50 | 5-30 |
| Co-surfactant(s) (optional) | 0.5-30 | 1-15 |
| Oil | 0-99 | 1-60 |

The presence of liquid crystal phases in a given system may be determined by several techniques including, but not necessarily limited to, polarizing optical microscopy, differential scanning calorimetry, low shear rate rheology, small-angle X-ray scattering, small angle neutron scattering and $^2H$ nuclear magnetic resonance replacing water by $D_2O$, among others. The existence of these phases and the type of phase will depend on many parameters including but not necessarily limited to, type, properties and proportion of the various components of the system and conditions of the environment such as temperature of the formation; therefore those with ordinary skill in the art of making liquid crystals would be able to design the system with the appropriate formulation and conditions to ensure that liquid crystal phases are present in the fluid. FORGIARINI et al., "Formulation of Nanoemulsions by Low-Energy Emulsification Methods at Constant Temperature" *Langmuir* 2001, 17, 2076-2083, contains FIG. 2 as a typical phase diagram of a surfactant-water-oil system where various liquid crystal, microemulsion and liquid phases coexist for different proportions of components, namely: $O_m$ isotropic liquid phase; $L_\alpha$ lamellar LC phase; D' shear birefringent liquid phase; Wm bluish liquid phase (microemulsion); W aqueous liquid phase, O oil phase; MLC multiple phase region including lamellar LC.

FIG. 2 from KUNIEDA et al., "Self-Organizing Structures in Poly (oxyethylene) Oleyl Ether—Water System" *J. Phys. Chem. B* 1997, 101, 7952-7957, shows the binary water-surfactant phase diagram where, depending on the surfactant concentration and the proportion of ethoxylated units in the surfactant molecule, various liquid crystalline phases namely hexagonal $H_1$, reverse hexagonal $H_2$, lamellar $L_\alpha$, normal bicontinuous cubic $V_1$, reverse bicontinuous cubic $V_2$, coexists with isotropic bicontinuous surfactant (reverse type), aqueous phase containing surfactant aggregates, reverse micellar solution and excess water phases. Note that these phases are in the absence of a non-aqueous phase.

FIG. 11 from ALEXANDRIS, et al ., "A Record Nine Different Phases (Four Cubic, Two Hexagonal, and One Lamellar Lyotropic Liquid Crystalline and Two Micellar Solutions) in a Ternary Isothermal System of an Amphiphilic Block Copolymer and Selective Solvents (Water and Oil)," *Langmuir* 1998, 14, 2627-2638 shows the progression of liquid crystalline phases with increasing total copolymer content at the copolymer-water (oil-lean) and the copolymer-oil (water-lean) sides of a ternary copolymer-water-oil phase diagram. Depending on the proportion of copolymer in the system the structure resulting from the self-assembly of the copolymer can vary from normal micellar $L_1$, reverse micellar $L_2$, normal micellar cubic $I_1$, reverse micellar cubic $I_2$, lamellar $L_\alpha$, normal hexagonal $H_1$, reverse hexagonal $H_2$, normal bicontinuous cubic $V_1$ and reverse bicontinuous cubic $V_2$.

Although water is expected to be the polar liquid used to make the liquid crystals, it will be appreciated that other liquids of intermediate polarity such as alcohols and glycols, alone or together with water, may be used. Nonaqueous liquid crystalline compositions may also be formulated as described by E. FRIBERG et al., "A Non-aqueous Microemulsion", *Colloid & Polymer Sci.* 262, 252-253(1984). For some applications, organic liquids may be expected to be used to make the liquid crystalline formulation. To be explicit, it should also be appreciated that the liquid crystals described herein may be present in a water-continuous emulsion, an oil-continuous emulsion and/or a bicontinuous emulsion. In the sense used in this paragraph, "emulsion" is defined to include all types of emulsions including, but not necessarily limited to macroemulsions, miniemulsions, microemulsions and nanoemulsions.

The liquid crystals, in one non-limiting embodiment, may be contained within reversible phase change elements, which may be understood to be form stable, that is, while a component within the reversible phase change element may change phase, the form, i.e. shape and/or volume of the reversible phase change elements remains the same. Because it is desirable to use the reversible phase change elements repeatedly to absorb and give off heat, it is desirable that the components of the liquid crystals are restricted and/or restrained from mingling with and being lost to a base fluid containing the reversible phase change elements.

One type of form stable reversible phase change elements are micro- and macrocapsules having the liquid crystals or other phase change materials therein. Macrocapsules are defined herein as having a diameter of greater than 5000 microns (0.5 cm) up to about 15,000 microns (1.5 cm), whereas a microcapsule is one having a diameter of 5000 microns or less. The manufacture of microcapsules and macrocapsules is well known, for instance please see the methods described in U.S. Pat. Nos. 6,841,593; and 6,126,872, incorporated herein by reference in their entirety. Other physical and chemical methods may be used to encapsulate liquid crystal and other phase change materials. The cores of the microcapsules and macrocapsules would contain liquid crystals or other phase change materials, but the shells would be durable, permitting the contents to undergo reversible phase changes many times to transfer heat from a relatively hot portion of a system to a relatively cool environment many times. Thus, the particular shell materials mentioned in these patents are likely to be unsuitable for the methods herein since they are desired to release a drag reducing agent primarily through dissolution when the capsule is introduced into a flowing hydrocarbon fluid such as crude oil. Instead, suitable shell materials for the compositions and the methods herein may include, but are not necessarily limited to, materials that will not undergo any phase change and will maintain their mechanical integrity in the temperature range of interest, such as amorphous carbon, ceramic base materials, or metals. The elements or particles may be encapsulated by a thin film to prevent the molten particles from interacting with the moving fluid. The film or shell would not undergo any phase transition and the particles or elements would remain form stable as the contents or core undergo phase transitions. The encapsulation process should not be restricted to individual particles to the extent that it is possible to create a porous microscopic solid particle in which each pore is filled with the phase change material. Such a particle can be created by spray-drying a dispersion of the phase change material or liquid crystal.

It will be appreciated that the amount of liquid crystals or other phase change materials to be added or included in the fluids is difficult to determine and predict in advance with much accuracy since it is dependent upon a number of inter-related factors including, but not necessarily limited to, the fluid type, the temperature of the relatively hot portion of the system, pipe, formation, etc., the particular LC-forming components (surfactant or surfactant blend, type of polymer, copolymer or nanotube used, etc.) Nevertheless, in order to give some idea of the quantities used, in one non-limiting embodiment, the proportion of reversible phase change elements within the base fluid ranges from about 0.05 wt % independently to about 30 wt %, alternatively from about 0.1 independently to about 10 wt %. In the embodiment for cooling of submerged equipment, the proportion of reversible phase change elements ranges from about 5 independently to about 30 wt %, alternatively from about 1 independently to about 40 wt %.

Suitable base fluids include, but are not necessarily limited to, water-based fluid, an oil-based fluid, a water-in-oil emulsion, an oil-in-water emulsion, and combinations thereof. In the non-limiting embodiments where the base fluid includes brine, the salts suitable for use in creating the brine include, but are not necessarily limited to, ammonium chloride, sodium chloride, potassium chloride, calcium chloride, sodium bromide, calcium bromide, zinc bromide, sodium formate, potassium formate, cesium formate, magnesium chloride or acetate and combinations thereof. The density of the brines may range from about 8.4 lb/gal to about 15 lb/gal (about 1 to about 1.8 kg/liter), although other densities may be given elsewhere herein.

Hydrocarbon production may also be increased by the use of submersible pumps and other equipment. The efficiency, life, and heat dispersion of the submersible pump and other equipment can be important to a production operation. Liquid crystals or other phase change materials may be used to channel and move the heat from the pump and other equipment to a cooler environment, in non-limiting embodiments the cooler water above the equipment, thereby reducing the heat load and increasing the life of the submersible pump. A similar process may be used to cool drill bits at the bottom of a drill string in a wellbore. Liquid crystals within reversible phase change elements may be designed to both lubricate and remove heat from drill bits. Fluids containing liquid crystals may exhibit superior bit cooling properties of the drilling bit since the self organized systems may be designed in a way that changes in molecular order/disorder due to a thermal stimuli favor the heat absorption-release process.

In one non-limiting embodiment the fluids described herein are self-responsive or "smart" fluids, namely those which change structure in response to one or more stimulus as previously described, for instance, temperature. Such self-responsive or smart fluids may be liquid crystals built by various types of interactions (e.g. hydrogen bonding, charge transfer and ionic bonds) to form complex functional and mechanical structures that respond to external stimuli, resulting in changes of the shape, size and properties of the materials.

The invention will be further described with respect to the Figure which is not meant to limit the invention, but rather to further illustrate the various embodiments.

FIG. 1 is a schematic illustration of a wellbore 10 extending from the surface 12 having a fluid 14 circulating therein where it is schematically shown that fluid 14 contains a plurality of reversible phase change elements 16. In the particular non-limiting embodiment shown, the fluid 14, in a non-restrictive instance a drilling fluid, is pumped in the direction of the white arrows down through a drilling string 30, out a drill bit 32 and up the annulus 34. The reversible phase change elements 16, in one non-limiting embodiment, include a core 18 containing or including the phase change components, such as liquid crystals in a non-limiting embodiment, adapted to change through at least two phased contemplated herein and a shell 20 surrounding the core 18 that is inert with respect to the fluid 14. By inert is meant insoluble in the fluid under the expected temperature and pressure conditions of the method, and sufficiently durable to withstand the shearing and pumping forces of repeatedly circulating the fluid 14 through the wellbore 10. It will be appreciated that the reversible phase change elements 16 are depicted as significantly proportionally larger, relative to the fluid, than they would be in actuality, for the purposes of illustration and clarity herein. The reversible phase change elements 16 absorb heat in a relatively hot zone or portion 22 of the wellbore 10 and undergo a phase change as indicated by the darker color of cores 18'. The absorption of heat by the reversible phase change elements 16 in the hot zone or portion 22 is indicated schematically by the black arrows pointing to the reversible phase change elements 16. This phase change may be any suitable phase change including, but not necessarily limited to, a change from solid to smectic liquid crystal, from solid to nematic liquid crystal, from smectic liquid crystal to isotropic liquid, from nematic liquid crystal to isotropic liquid, from solid to isotropic liquid, and combinations thereof.

As the reversible phase change elements 16 travel up the annulus 34 toward the surface 12, they release heat (indicated by the black arrows directed away from the reversible phase change elements 16) in a reverse phase change in a relatively cooler zone 24 of the wellbore 10. Heat may also be released into a relatively cool environment elsewhere, such as on the surface, to the atmosphere, in a heat exchanger, etc. The reversed phase change is schematically illustrated by the reversion of the darker core 18' changing back to the lighter core 18. It should be understood that the relatively cooler zone 24 may be any place in the wellbore 10, or may not even be in the wellbore 10, but may be on the surface 12, such as a heat exchanger (not shown). Similarly, while it is expected that the relatively hot portion 22 of the wellbore 10 would be the deepest portion thereof, it is possible that the relative hot portion 22 is in a different portion of the conduit or wellbore 10.

It will be appreciated that FIG. 1 only schematically shows one reversible phase change. Multiple phase changes may occur as well depending on the specific phase change material.

It is not possible to guess in advance all of the possible situations and systems where the methods and compositions described herein may be useful, and in particular what the temperature ranges of the relative hot portions and relative cooler portions of the overall system will be. However, to give a general sense of the possible ranges, in the embodiment of removing or redistributing heat from a wellbore, the relative hot portion of the wellbore may range from about 100 to about 400° C., whereas the relatively cool portion of the wellbore or cool environment may range from about 0 to about 40 ° C.

In the embodiment where heat is removed from a submerged pump or other equipment, the relatively hot portion or zone may range from about 100 to about 400° C., whereas the relatively cool zone or environment may range from about 0 to about 40° C.

The invention will now be illustrated with respect to certain examples which are not limiting but provided for the further illumination of the invention.

Mathematical Modeling

Figure 2A:
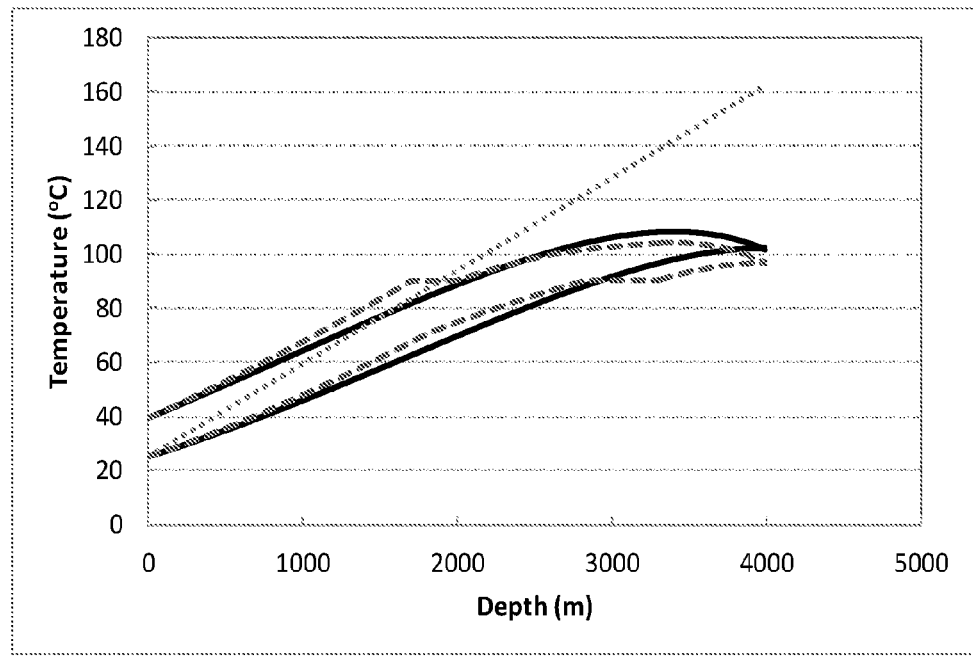
FIG. 2A is a graph of a temperature profile for a circulating drilling fluid without PCM (solid) and with a PCM with a melting point of 90° C. (dashed), where the dotted straight line is formation temperature.
Figure 2B:
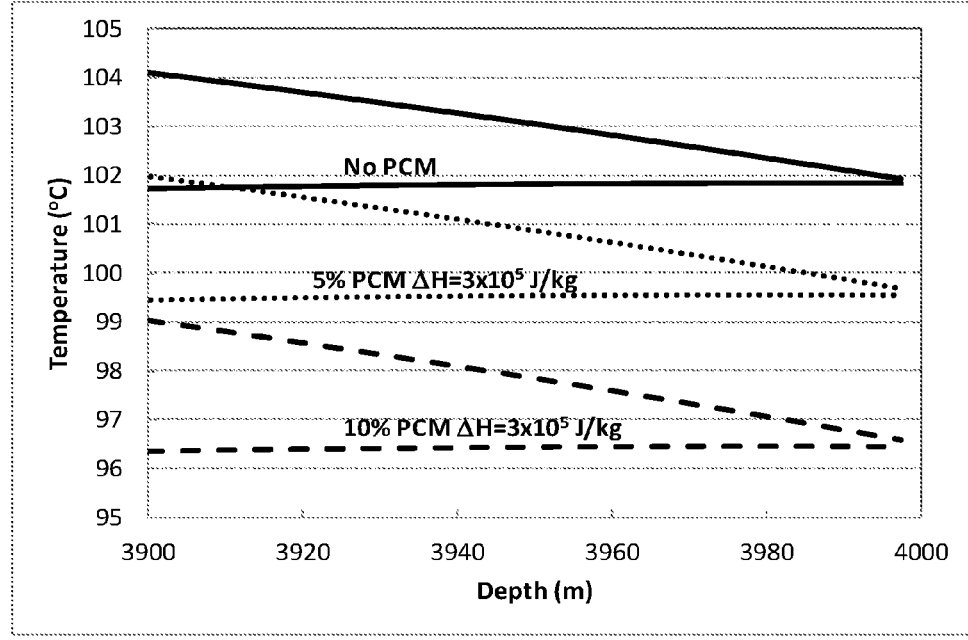
FIG. 2B is a graph of an enlarged scale of a portion of FIG. 2A showing the temperature near the bottom for a drilling fluid without PCM and with two concentrations of PCM.

A one-dimensional mathematical model of the circulating fluid through the drill-pipe and annulus was developed to estimate the impact of adding PCMs on its temperature. The model was used to calculate temperature in oil-based muds as well as in water-based muds. FIG. 2A is a graph of a temperature profile for a circulating drilling fluid without PCM (solid) and with a PCM with a melting point of 90° C. (dashed), where the dotted straight line is formation temperature. FIG. 2B is a graph of an enlarged scale of a portion of FIG. 2A showing the temperature perature near the bottom for a drilling fluid without PCM and with two concentrations of PCM.

More particularly, FIG. 2A compares the temperature profile of two drilling fluids; the solid line corresponds to one without PCM and the dotted line corresponds to one with 5% (weight) of PCM. FIG. 2B shows the temperature near the wellbore bottom for three cases, namely without PCM, with 5% and with 10%. The particular PCM used for the calculations consisted of a wax with melting point of 90° C. and latent heat of $3 \times 10^5$ J/kg. Introduction of this PCM results in lowering the temperature by 2.5° C. and 5.5° C. for a 5% and 10% addition, respectively. Thus, the mathematical modeling demonstrates the feasibility of the methods and compositions described herein.

In the foregoing specification, the invention has been described with reference to specific embodiments thereof, and has been suggested as effective in providing effective methods and compositions for transferring heat in a variety of operations in wellbores, subterranean reservoirs and formations as well as cooling submerged pumps and other equipment. However, it will be evident that various modifications and changes may be made thereto without departing from the broader spirit or scope of the invention as set forth in the appended claims. Accordingly, the specification is to be regarded in an illustrative rather than a restrictive sense. For example, specific combinations of components and other, different components for forming the reversible phase change elements, in a non-limiting embodiment such as liquid crystals including the components thereof such as surfactants, co-surfactants, non-polar liquids, polar liquids (e.g. water or brine), polymers, copolymers, carbon nanotubes, etc. and proportions thereof as well as shell materials for the elements, falling within the claimed parameters, but not specifically identified or tried in a particular fluid to improve the ability to remove heat from a relatively hot portion of a wellbore or part of a system of piece of equipment, are anticipated to be within the scope of this invention.

The present invention may suitably comprise, consist or consist essentially of the components, steps and elements disclosed and may be practiced in the absence of a component, step or element not disclosed. For instance, the working fluid may consist essentially of or consist of a base fluid that may be an aqueous fluid and/or a non-aqueous fluid, and a plurality of form stable reversible phase change elements which comprise an aqueous phase, a non-aqueous phase, and a liquid crystal-forming component that consists essentially of or consists of at least one surfactant, at least one polymer, at least one copolymer, nanotubes, and mixtures thereof. Additionally, the heat removal method may consist essentially of or consist of transporting a fluid through the conduit where the fluid comprises a base fluid and a plurality of reversible phase change elements, contacting the relatively hot portion of the conduit with the fluid and changing the phase of the reversible phase change elements by the absorbing of heat, and transporting the fluid to a relatively cool environment and reversing the phase change of the reversible phase change elements releasing heat into the relatively cool environment.

The present invention may suitably comprise, consist or consist essentially of the components, steps and elements disclosed and may be practiced in the absence of a component, step or element not disclosed. For instance, the working fluid may consist essentially of or consist of a base fluid that may be an aqueous fluid and/or a non-aqueous fluid, and a plurality of form stable reversible phase change materials which comprise an encapsulated polymer with melting temperature within the temperature range of interest. Additionally, the heat removal method may consist essentially of or consist of transporting a fluid through the conduit where the fluid comprises a base fluid and a plurality of reversible phase change elements which comprise an encapsulated polymer with melting temperature within the temperature range of interest, contacting the relatively hot portion of the conduit with the fluid and changing the phase of the reversible phase change elements by the absorbing of heat, and transporting the fluid to a relatively cool environment and reversing the phase change of the reversible phase change elements releasing heat into the relatively cool environment.

The words "comprising" and "comprises" as used throughout the claims is to be interpreted "including but not limited to".

What is claimed is:

1. A method of removing heat from a relatively hot portion of a wellbore comprising:
    transporting a fluid through the wellbore where the fluid comprises a base fluid and a plurality of reversible phase change elements;
    contacting the relatively hot portion of the wellbore at a temperature between about 100 to about 400° C. with the fluid and where absorbing heat causes at least part of the reversible phase change elements to change phase, where the phase change is selected from the group consisting of:
        a change from solid to liquid crystal,
        a change from solid to isotropic liquid,
        a change from liquid crystal to isotropic liquid,
        a change from liquid crystal to solid,
        a change from isotropic liquid to solid,
        a change from isotropic liquid to liquid crystal, and
        combinations thereof; and
    transporting the fluid to a relatively cool environment at a temperature between about 0 to about 40° C. and reversing the phase change of the reversible phase change elements releasing heat into the relatively cool environment.

2. The method of claim 1 where the reversible phase change elements are form stable.

3. The method of claim 1 where multiple consecutive phase changes occur as the fluid temperature increases, and multiple reverse phase changes occur as the temperature decreases.

4. The method of claim 1 where the fluid is selected from the group consisting of drilling fluids, drill-in fluids, production fluids, servicing fluids, workover fluids, and remediation fluids.

5. The method of claim 4 where in the fluid, the proportion of reversible phase change elements ranges from about 0.05 to about 30 wt %.

6. The method of claim 1 where a structure selected from the group consisting of a tool, a piece of equipment, and combinations thereof is present in the relatively hot portion of the wellbore and the method further comprises removing heat from the structure.

7. The method of claim 6 where in the fluid, the proportion of reversible phase change elements ranges from about 1 to about 40 wt %.

8. The method of claim 1 where the base fluid comprises a phase change material comprising a liquid crystal-forming component selected from the group consisting of at least one surfactant, at least one polymer, at least one copolymer, nanotubes, and mixtures thereof.

9. The method of claim 8 where the non-aqueous phase, and the liquid crystal-forming component are encapsulated in a capsule that is form stable in the method, where the capsule comprises a shell.

10. A method of removing heat from a relatively hot portion of a wellbore comprising:
    transporting a fluid through the wellbore where the fluid comprises a base fluid and a plurality of reversible phase change elements, where the base fluid comprises an aqueous phase, a non-aqueous phase, and a phase change material;
    contacting the relatively hot portion of the wellbore at a temperature between about 100 to about 400° C. with the fluid and absorbing heat causes at least part of the reversible phase change elements to change phase, where the phase change is selected from the group consisting of:
        from solid to liquid crystal,
        from solid to isotropic liquid,
        from liquid crystal to isotropic liquid,
        from liquid crystal to solid,
        from isotropic liquid to solid,
        from isotropic liquid to liquid crystal, and
        combinations thereof; and
    transporting the fluid to a relatively cool environment at a temperature between about 0 to about 40° C. and reversing the phase change of the reversible phase change elements releasing heat into the relatively cool environment.

11. The method of claim 10 where the reversible phase change elements are form stable.

12. The method of claim 10 where in the fluid, the proportion of reversible phase change elements ranges from about 0.05 to about 30 wt %.

13. The method of claim 10 where the phase change material comprises a liquid crystal-forming component selected from the group consisting of at least one surfactant, at least one polymer, at least one copolymer, nanotubes, and mixtures thereof.

14. The method of claim 13 where the non-aqueous phase, and the liquid crystal-forming component are encapsulated in a capsule that is form stable in the method, where the capsule comprises a shell.

15. A method of removing heat from a relatively hot portion of a wellbore comprising:
    transporting a fluid through the wellbore where the fluid comprises a base fluid and a plurality of form stable reversible phase change elements, where the fluid is selected from the group consisting of drilling fluids, drill-in fluids, production fluids, servicing fluids, workover fluids, and remediation fluids;
    contacting the relatively hot portion of the wellbore at a temperature between about 100 to about 400° C. with the fluid and where absorbing heat causes at least part of the reversible phase change elements to change phase, where the phase change is selected from the group consisting of:
        a change from solid to liquid crystal,
        a change from solid to isotropic liquid,
        a change from liquid crystal to isotropic liquid,
        a change from liquid crystal to solid,
        a change from isotropic liquid to solid,
        a change from isotropic liquid to liquid crystal, and
        combinations thereof; and
    transporting the fluid to a relatively cool environment at a temperature between about 0 to about 40° C. and reversing the phase change of the reversible phase change elements releasing heat into the relatively cool environment.

16. The method of claim 15 where in the fluid, the proportion of reversible phase change elements ranges from about 0.05 to about 30 wt %.

17. The method of claim 15 where the base fluid comprises an aqueous phase, a non-aqueous phase, and a phase change material.

18. The method of claim 15 where the phase change material comprises a liquid crystal-forming component selected from the group consisting of at least one surfactant, at least one polymer, at least one copolymer, nanotubes, and mixtures thereof.

19. The method of claim 18 where the non-aqueous phase, and the liquid crystal-forming component are encapsulated in a capsule that is form stable in the method, where the capsule comprises a shell.

* * * * *